United States Patent Office 3,637,598
Patented Jan. 25, 1972

3,637,598
2-PYRROLIDONYL POLYACROLEIN
Nathan D. Field, Allentown, and David I. Randall, Easton, Pa., and Jimmie D. Fitzpatrick, Lafayette, La., assignors to GAF Corporation, New York, N.Y.
No Drawing. Filed Feb. 13, 1969, Ser. No. 799,072
Int. Cl. C08g 9/28
U.S. Cl. 260—72 R
2 Claims

ABSTRACT OF THE DISCLOSURE

A new composition of matter comprising 2-pyrrolidonyl polyacrolein.

---

The instant invention relates to new polymeric materials and to their preparation. In particular the instant invention relates to a new composition of matter comprising 2-pyrrolidonyl polyacrolein. Polyacrolein has been prepared in the past by free radical polymerization processes such as are described in Acrolein, Smith, C. W., John Wiley & Sons Inc., New York (1962), page 225, and Kinetics and Mechanisms of Polymerization, Ham, G. E., M. Decker, New York, Volume 1, Part 1—Vinyl Polymerization (1967), page 410. It is also known that unstabilized acrolein spontaneously polymerize upon standing to produce a solid, non-fusible and insoluble product which has been designated as "disacryl." (Redtendbacher, Liebigs Ann. Chem. 47 (1843), p. 113.)

While polyacrolein has been thought to be useful for several purposes, there have been several difficulties in the handling of same. Particularly, it has in the past been difficult to effect the solution of polyacrolein while simultaneously maintaining its high molecular weight and aldehyde functionality. U.S. Pat. 3,235,524 teaches that high molecular weight free radical polymerized acrolein is insoluble in all common organic solvents. The patent also teaches that a macromolecular infusible insoluble homopolymer of acrolein which is substantially devoid of free aldehyde groups may be converted into a soluble product in aqueous sulfurous acid solutions by reaction with said acid at elevated temperatures. The quantity of acid employed in the reaction is sufficient to dissolve the reaction product.

Further work done in the area has indicated that high molecular weight polyacrolein is insoluble in all organic solvents at a temperature below 80° C. including organic solvents such as dimethyl formamide, N-methyl pyrrolidone, dimethyl sulfoxide, dioxane, benzene and ethyl acetates.

It is an object of the instant invention to provide new polymeric derivatives.

Another object of the instant invention is to provide soluble polymeric derivatives of polyacrolein.

Yet another object of the instant invention is to provide new soluble derivatives of polyacrolein which are particularly useful and valuable for photographic and other industrial uses.

These and other objects of the instant invention will become more evident from the following more detailed description thereof.

We have found that normally insoluble polyacrolein may be made soluble at room temperature in various polar organic solvents such as dimethylformamide by reacting said polyacrolein with 2-pyrrolidone. In general the useful polyacrolein compounds include those which are prepared from α,β-ethylenically unsaturated aldehydes, i.e., those compounds which have an ethylenic group in the α,β-position relative to the aldehyde group, such as, for example, acrolein, α- and β-substituted acroleins such as α-ethylacrolein, α-isobutylacrolein, α-chloroacrolein, β-phenylacrolein, α-decylacrolein, α-cyclohexylacrolein, etc. The preferred aldehydes include alpha, beta-monoethylenically unsaturated monoaldehydes containing from 3 to 12 carbon atoms, and especially the alpha and beta-substituted acroleins wherein the substituent on the alpha and/or beta positions is an alkyl, cycloalkyl or aryl group containing no more than 8 carbon atoms. 2-alkenals containing up to 8 carbon atoms come under special consideration. These aldehydes may in general be prepared by spontaneous polymerization of acrolein which on standing results in a solid, non-fusible and insoluble product which has been designated as disacryl (Redtendbacher, Liebigs Ann. Chem. 47 (1843) p. 113. Furthermore, as stated above, acrolein polymerizes under the influence of radical forming catalysts to produce insoluble polymers which are insoluble in known organic solvents. Suitable catalysts which may be employed, include among others, the peroxides, such as benzoyl peroxide, hydrogen peroxide, potassium persulfate, alkali perborates, diacetyl peroxide, tertiary butyl hydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like, and azo catalysts, such as organic compounds containing an N=N group as alpha, alpha' - azodiisobutyronitril, alpha,alpha' - diisobutyrate, alpha,alpha' - azobis(alpha,gamma-dimethylvaleronitrile), alpha,alpha - azodiisobutyramide, alpha,alpha - azobis-(alpha - cyclopropylpropionitril), alpha,alpha' - (alpha-methylbeta - phenylpropionitril), alpha-(carbamylazoisobutyronitril), alpha,alpha-azobis(alpha-cyclohexylpropionitrile, 1,1'-azodicyclohexanecarbonitrile, diazoaminobenzene, 1,1'-azobis(1-phenylethane) and the like, and various aldoximes, ketoximes, azines and the like.

The polymers of the above-described unsaturated aldehydes to be employed in preparing the new derivatives of the present invention are those obtained by addition polymerization through the double bond and those having a high molecular weight, i.e., those having a molecular weight above 50,000 and perferably between 100,000 and 2,000,000, said molecular weights being determined by the light scattering technique. The molecular weight range may also be indicated by intrinsic viscosity values as these are usually more easily determined. Preferred polymers are those having intrinsic viscosities (as determined on the solubilized form of the polymer) of at least 0.9 dl./g. and preferably between 0.9 dl./g. and 5.0 dl./g. These values are determined by the conventional technique of polyelectrolyte viscosity measurements at 25° C.

We have found that when the above-noted high molecular weight polyacroleins are placed in contact with 2-pyrrolidone they dissolve quite readily even up to about 15% by weight. This solubility is attributed to the formation of a new product, 2-pyrrolidonyl polyacrolein. Furthermore, this solution appears to occur without appreciable reduction in the molecular weight of the polyacrolein. Also the aldehyde function is still present, as is evidenced by its ready reaction with aqueous $SO_2$ or sodium bisulfite to form new bisulfite addition products as claimed in our copending application, Ser. No. 799,108 filed Feb. 13, 1969.

The pyrrolidonyl polyacrolein product of the instant invention is stable, as evidenced by the fact that pyrrolidone is not removed by treatment with hot water dilute acid nor by reaction with $SO_2$ or metal bisulfites. The reaction with metal bisulfites is quite surprising since the entire polymer dissolves in water as the bisulfite addition product without the loss of a pyrrolidone moiety.

In general, the average empirical formula for the new product of the instant invention shows at least one 2-pyrrolidone unit introduced into polyacrolein for four acrolein units. The product has the general structural formula similar to:

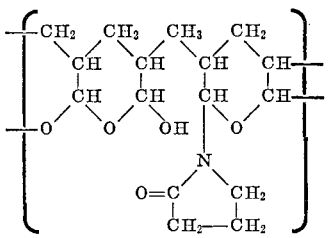

The preferred product has a ratio of acrolein units to pyrrolidone units from about 7:1 to about 3:1 and in general the pyrrolidone derivative of the instant invention has a relatively low nitrogen content in the range of from about 2.5 to about 6%. As distinguished from the compound of interest, other products have been prepared which are the reaction products of pyrrolidine with polyacrolein. These products, however, have a much higher nitrogen content than that set forth above and would therefore indicate that said reaction products with pyrrolidine have a low ratio of acrolein units to pyrrolidine units. The new product of the instant invention is very useful either in 2-pyrrolidone solution or as the aqueous bisulfite addition compound as described in our copending application Ser. No. 799,108, filed Feb. 13, 1969, in cross-linking polyalcohols and polyamides such as gelatin. The new products are also useful in combination with common polar organic solvents such as dimethyl formamide and N-methyl pyrrolidone. From these solutions clear brittle films may be cast.

In addition to the homopolymer reaction product of acrolein and pyrrolidone copolymers of acrolein with other ethylenically unsaturated monomers such as those possessing at least one =C=C= group and preferably those containing a $CH_2$=C= group such as, for example, styrene, α-methyl styrene, butadiene, isoprene, methyl pentadiene, ethylene, propylene, isobutylene, isooctene, vinyl acetate, vinyl propionate, vinyl pyridine, vinyl naphthalene, vinyl cyclohexene, acrylonitrile, methacrylonitrile, vinyl chloride, vinylidene chloride, acrylate esters such as methyl methacrylate, ethyl acrylate, ethyl methacrylate, butyl acrylate and allyl compounds such as allyl acetate, allyl alcohol, allyl butyrate, allyl benzoate, allyl cyclohexane carboxylate, allylamine, etc., will also react with the pyrrolidone to form a product which has 2 pyrrolidone groups. These polymers have their aldehyde groups substantially available while at the same time are more soluble in common solvents than their pyrrolidone-free precursors.

EXAMPLE 1

25 g. of polyacrolein prepared by redox polymerization of acrolein in an aqueous medium with a redox system composed of potassium persulfate and silver nitrate was added to 475 g. of 2-pyrrolidone and heated to 80° C. with stirring for four hours. The resulting viscous yellow solution was filtered through a sintered glass filter. The solution was added to 3 liters of acetone to yield a pale yellow powder which upon drying at room temperature weighed 26.1 g. and analyzed as follows: C, 59.66%; H, 7.54%; and N, 4.54%.

EXAMPLE 1a

Preparation of the polyacrolein

Charged to a 2 l. multinecked spherical flask with stirrer, condenser, thermometer, temperature controller, nitrogen purge, were 1354.4 g. water, 175.1 g. freshly distilled acrolein. This was heated to 45° C. with nitrogen purging. Then, with stirring, was added 25.0 g. potassium persulfate, the nitrogen purge continued, the stirring continued, and the temperature maintained at 45° C. for two days. During this time the batch became white and thick with precipitated polyacrolein. The slurry was filtered, washed well on the filter with water, and dried in a vacuum oven. Yield 61.2 grams white powder. IR bands at 2.9, 3.42, 5.8, 6.12, 6.86, 7.17, 7.35, 7.52, 9.75, 12.05, microns.

EXAMPLE 2

90 g. of polyacrolein prepared by the method of Example 1 was added to 450 g. of 2-pyrrolidone and heated to 80° C. with stirring for four hours. The procedure of Example 1 was followed and the results obtained were similar thereto. The precipitated pyrrolidonyl polyacrolein was found to be soluble in N-methyl-2-pyrrolidone, pyrrolidone, dimethyl formamide and hexamethyl phosphoramide. Analysis of the product resulted in the conclusion that a minimum ratio of about 1 pyrrolidone unit per 4 acrolein units were present in the pyrrolidonyl polyacrolein product.

EXAMPLE 2a

Preparation of the 2-pyrrolidonyl polyacrolein 21 g. polyacrolein from example above and 200 ml. benzene were mixed in a reflux flask and 28 g. 2-pyrrolidone were added. The batch was refluxed for four hours, the solid filtered off, washed with additional benzene by reslurrying and refiltering, and then dried. This material was found to contain 3.61% nitrogen. This corresponds to 1 pyrrolidone unit reacted per 5.28 acrolein units.

EXAMPLE 3

A solution of (2-pyrrolidonyl) polyacrolein was prepared by heating to 80° a solution consisting of 1.5 g. of 2-pyrrolidone and 16.5 g. of N-methyl 2-pyrrolidone and adding 2.0 g. of polyacrolein of Example 1. The resulting mixture was stirred for 4 hours at which time complete solution had been effected. A film cast from this 10% solution was dried under vacuum and found to be clear and brittle.

EXAMPLE 4

5.6 g. of polyacrolein prepared as in Example 1 was added to 100 cc. benzene containing 8.5 g. of 2-pyrrolidone. The system was stirred and heated to reflux for approximately 6 hours employing a water cooled condenser and a water separator. About one-half cc. of water was collected and the residue after filtration and drying under 1 mm. of mercury for 2 hours weighed 6.07 g. and upon analysis the following composition was found: C, 57.54%; H, 7.50%; N, 5.66%.

EXAMPLE 5

25 g. of polyacrolein prepared by spontaneous polymerization was added to 150 g. of free 2-pyrrolidone and heated to 80° C. with stirring for 4 hours. The resulting viscous solution was filtered through a sintered glass filter and the filtrate was added to 3 liters of acetone to yield a product which, when analyzed, was similar to the product of Example 1.

While various preferred embodiments of the present invention have been illustrated by way of specific example, it is to be understood that the present invention is in no way to be deemed as limited thereto, but should be construed as broadly as all or any equivalents thereof.

The reactions according to the instant invention can be carried out at room temperature but moderately raised temperatures tend to expedite the reactions. Exceedingly high temperatures and temperatures in excess of 150° C. can in addition to expediting the reaction, promote side reactions which may be detrimental to the end product thereof. In general, the formation of the desired 2-pyrrolidonyl polyacrolein takes place upon the addition of polyacrolein to 2-pyrrolidone. The amounts employed may vary depending upon the amount of end product desired. In most instances it is easier to employ an excess of 2-pyrrolidone over that which based on theoretical considerations will react with the polyacrolein inasmuch as the desired end product is formed as a solution in the 2-pyrrolidone.

What is claimed is:

1. A high molecular weight polymer consisting essentially of the reaction product of (1) polyacrolein and (2) 2-pyrrolidone, the ratio of acrolein units to pyrrolidonyl units in the polymer being from about 7:1 to about 3:1, said polymer having a nitrogen content of from about 2.5 to about 6%.

2. The polymer of claim 1 wherein the reaction product is obtained by heating said polyacrolein and 2-pyrrolidone at a temperature up to 150° C.

References Cited

UNITED STATES PATENTS

| | | | |
|---|---|---|---|
| 3,121,700 | 2/1964 | Bergman | 260—29.6 |
| 3,177,171 | 4/1965 | Gruber et al. | 260—29.6 |
| 3,235,524 | 2/1966 | Kern et al. | 260—29.6 |
| 3,244,584 | 4/1966 | Stewart et al. | 162—168 |
| 3,258,451 | 6/1966 | Rink et al. | 260—67 |
| 3,317,370 | 5/1967 | Kekish | 162—168 |
| 3,397,172 | 8/1968 | Schuler et al. | 260—72 X |

OTHER REFERENCES

Grant; Hackh's Chemical Dictionary; Third Edition (1944), p. 702.

WILLIAM H. SHORT, Primary Examiner

R. J. KOCH, Assistant Examiner

U.S. Cl. X.R.

260—8, 32.6 N, 67 UA